United States Patent
Arslan et al.

(10) Patent No.: US 12,439,257 B2
(45) Date of Patent: Oct. 7, 2025

(54) METHOD FOR PROTECTING WIRELESS COMMUNICATION AGAINST EAVESDROPPING ATTACKS

(71) Applicant: ISTANBUL MEDIPOL UNIVERSITESI, Istanbul (TR)

(72) Inventors: Hüseyin Arslan, Istanbul (TR); Muhammad Sohaib Jamal Solaija, Istanbul (TR); Hanadi Mohammad Youssef Suleiman, Istanbul (TR); Abuu Bakari Kihero, Istanbul (TR); Haji Muhammed Furqan Ahmed Madni, Istanbul (TR)

( * ) Notice: Subject to any disclaimer, the term of this patent is extended or adjusted under 35 U.S.C. 154(b) by 201 days.

(21) Appl. No.: 18/259,596

(22) PCT Filed: Dec. 24, 2021

(86) PCT No.: PCT/TR2021/051505
§ 371 (c)(1),
(2) Date: Jun. 28, 2023

(87) PCT Pub. No.: WO2022/146363
PCT Pub. Date: Jul. 7, 2022

(65) Prior Publication Data
US 2024/0056819 A1 Feb. 15, 2024

(30) Foreign Application Priority Data
Dec. 31, 2020 (TR) .................... 2020/22598

(51) Int. Cl.
*H04W 12/122* (2021.01)
*H04L 1/00* (2006.01)
*H04L 27/26* (2006.01)

(52) U.S. Cl.
CPC ......... *H04W 12/122* (2021.01); *H04L 1/0003* (2013.01); *H04L 27/2607* (2013.01)

(58) Field of Classification Search
None
See application file for complete search history.

(56) References Cited

U.S. PATENT DOCUMENTS

| | | | |
|---|---|---|---|
| 2005/0070320 A1* | 3/2005 | Dent | H04W 72/30 455/515 |
| 2018/0062811 A1 | 3/2018 | Akkarakaran et al. | |

(Continued)

FOREIGN PATENT DOCUMENTS

| | | |
|---|---|---|
| CN | 105847629 A | 8/2016 |
| CN | 111614648 A | 9/2020 |

OTHER PUBLICATIONS

International Search Report for corresponding PCT/TR2021/051505 dated Feb. 17, 2022.

(Continued)

*Primary Examiner* — Jeffrey R Swearingen
(74) *Attorney, Agent, or Firm* — Egbert, McDaniel & Swartz, PLLC

(57) ABSTRACT

Disclosed is a method to protect wireless communication signals from being overheard/intercepted by malicious eavesdroppers. The method has three main steps: selection of the coordinating transmission points (TPs) for the user whose communication is to be secured, splitting of the data that is to be sent to the aforementioned user into N parts, where N is the number of TPs used and channel based manipulation of the transmitted signal to ensure that delay spread is less than guard duration.

6 Claims, 3 Drawing Sheets

(56) References Cited

U.S. PATENT DOCUMENTS

2018/0259737 A1* 9/2018 Lee .................. H04W 12/0431
2019/0013978 A1 1/2019 Zhou et al.
2022/0248218 A1* 8/2022 Zach ........................ H04K 1/06

OTHER PUBLICATIONS

Written Opinion of the International Searching Authority for corresponding PCT/TR2021/051505 dated Feb. 17, 2022.
Solaija et al., "Enhancing Channel Shortening Based Physical Layer Security Using Coordinated Multipoint", arXiv:2109.14346 Sep. 29, 2021.
Jehad et al., "Classifications and Applications of Physical Layer Security Techniques for Confidentiality: A Comprehensive Survey", IEEE Communications Surveys & Tutorials (vol. 21, Issue: 2, Secondquarter 2019), Oct. 25, 2018, pp. 1773-1828.
Jehad et al., "CP-Less OFDM With Alignment Signals for Enhancing Spectral Efficiency, Reducing Latency, and Improving PHY Security of 5G Services", IEEE Access (vol. 6), Oct. 22, 2018, pp. 63649-63663.

\* cited by examiner

METHOD FOR PROTECTING WIRELESS COMMUNICATION AGAINST EAVESDROPPING ATTACKS

TECHNICAL FIELD

The present invention is a method to protect wireless communication signals from being overheard/intercepted by malicious eavesdroppers.

BACKGROUND

The broadcast nature of wireless communication renders it prone to various security threats. One of these threats is the violation of confidentiality of communication, also referred to as eavesdropping. In this case, a malicious node/device tries to intercept and interpret the communication going on between two legitimate nodes. Conventionally, security techniques, such as cryptography-based techniques, have been employed for secure transmission. However, such security techniques may not be adequate for future (5G and beyond) decentralized and heterogeneous networks due to the increased complexity of key management and sharing mechanisms [1].

Physical layer security (PLS) mechanisms have become increasingly popular in recent years. The following approaches are being used for PLS in multi-carrier systems such as OFDM:

Extraction of Secret Sequences from Wireless Channels: The basic idea in these types of PLS techniques is to extract random sequence from wireless channel [2]. The application numbered CN105847629A describes a reversible information hiding method for encrypted image. The method comprises the following steps of encrypting an original plaintext image according to an encryption key, embedding secret information into the encrypted image according to an information hiding key, decrypting the encrypted image including the secret information according to the encryption key and recovering the plaintext image and extracting the secret information according to a hidden secret. However, key generation approach is very sensitive to imperfect channel estimation and channel reciprocity mismatch.

Addition of Interfering (Noise/Jamming) Signals along with the Transmitted Signals: In this approach the legitimate node adds an intentional interfering signal by exploiting the null space of the legitimate user's channel in such a way that it degrades the performance at illegitimate receiver without affecting the performance at the legitimate receiver. However, it may sacrifice some power and throughput [3].

Channel-Based Adaptation Transmission: Adaptation based security techniques are also very popular PLS techniques in which transmitter parameters are adjusted based on channel conditions in order to fulfill the Quality of Service (QoS) requirements of the legitimate receiver only, for example, adaptive modulation and coding with Automatic Repeat Request (ARQ) [4], fading based sub carrier activation technique [5], optimal power allocation based techniques [6], channel shortening [7] and OFDM-subcarrier index selection for enhancing PLS [8]. Channel shortening approach [7] to protect against eavesdropping fails if the eavesdropper is closer to the TP and experiences better channel than the legitimate node. On the other hand, the coordinated multipoint concept [9] only focuses on improving the received power for the legitimate node, without utilizing any channel-based manipulation.

However, the existing channel-adaptation based PLS mechanisms fail to protect against eavesdropping attacks when the channel of the eavesdropper is better as compared to the legitimate node. Utilizing the coordinated multipoint concept, the data can be split in multiple parts and sent over different links. This way, even if the eavesdropper is closer to one of the coordinated transmission points (TPs), it will have struggle to receive the other splits of the data cleanly. This problem for the eavesdropper is further exacerbated by the use of channel-based adaptation techniques (e.g. channel shortening or adaptive guard band utilization) such that the channel impulse response or delay spread ($\tau_{max}$) experienced by the eavesdropper is larger than guard duration ($T_g$) for at least one of the data splits, leading to inter-symbol interference.

SUMMARY

This invention provides a mechanism of coordinated multipoint transmission to protect orthogonal frequency division multiplexing (OFDM) based communication against eavesdropping attacks. The proposed mechanism has three distinct parts:
  Selection of the coordinating transmission points for the user whose communication is to be secured.
  Splitting of the data that is to be sent to the aforementioned user into N parts, where N is the number of coordinating TPs used.
  Channel based manipulation of the transmitted signal to ensure the signal received at the legitimate node has delay spread, $\tau_{max}$ is less than the guard duration, i.e., $\tau_{max} \leq T_g$ but the same is not true for the illegitimate node, i.e, eavesdropper. As a result, the received signal at the eavesdropper has inter-symbol interference (ISI), which deteriorates its performance.

Coordinated multipoint systems have conventionally been used to improve reliability of communication, particularly the cell-edge user experience, by leveraging the coordination of different TPs. The proposed invention, on the other hand, uses the availability of multiple geographically distributed TPs to provide secure and confidential communication. This is achieved by splitting that data into different parts and sending them from separate TPs. Furthermore, some manipulation is done on the basis of the channel experienced by the legitimate receiver to ensure the delay spread it experiences is less than the used guard. This, however, does not hold for the eavesdropper, and it experiences ISI.

The proposed method provides a low-complexity (for the receiver) method that can be used in future wireless networks, rather than cryptographic approached. Furthermore, the densification of networks allows the use of coordinated networks. The proposed method also addresses the main limitation of existing channel-based adaptation methods of physical layer security, i.e., their failure if the channel of the eavesdropper is better than the legitimate user.

PART REFERENCES

Figure 1:
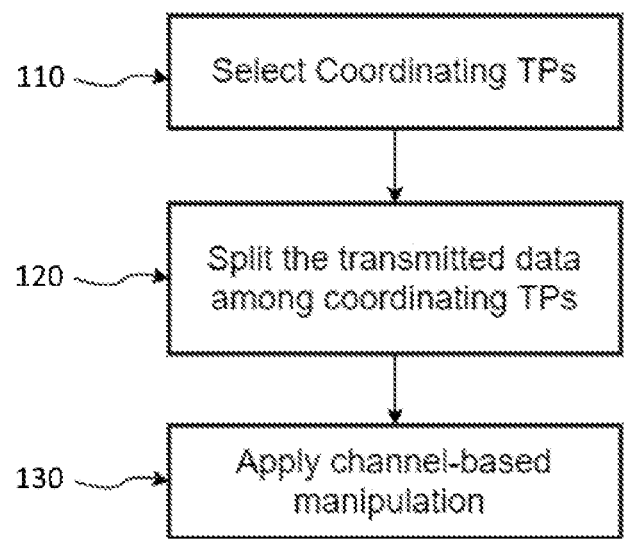
FIG. 1 is a flow chart of basic operations in accordance with certain aspects of the present disclosure.

110. Select coordinating TPs
120. Split the transmitted data among coordinating TPs
130. Apply channel-based manipulation
210. Original data
221. Split 1
222. Split 2
223. Split N
310. Delay spread of original channel 1
311. Delay spread of original channel 2
320. Channel-based manipulation stage (channel shortening technique)
321. Channel-based manipulation stage (adjusting the $T_g$)
330. Delay spread of experienced channel 1
331. Delay spread of experienced channel 2
411. TP 1
412. TP N
420. Device
430. Attacker
440. Combined splits
450. Combined splits suffer from inter-symbol interference
N: The number of coordinating TPs used
$T_g$: Guard duration

DETAILED DESCRIPTION

The proposed invention leverages the geographically distributed TPs offered by coordinated multipoint networks (and the consequent different delay spreads) to provide security against eavesdropping attackers in a wireless communication system.

Figure 2:
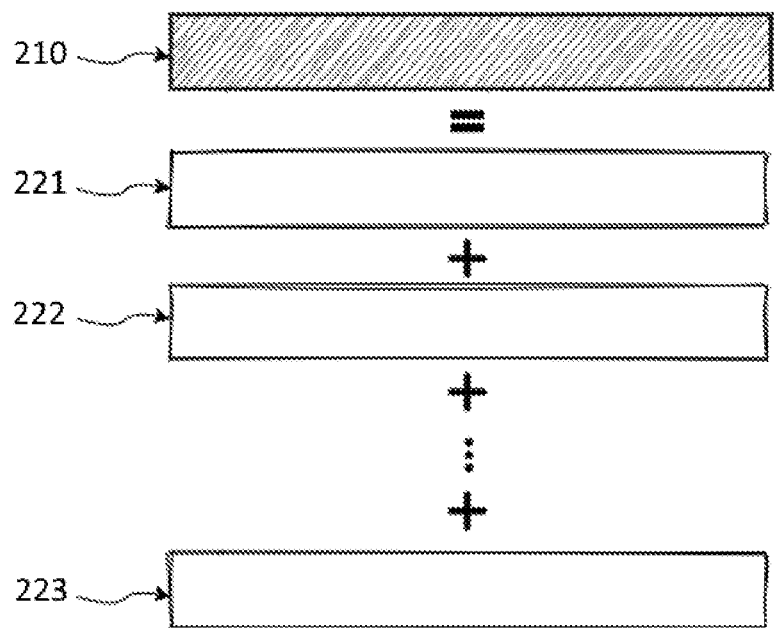
FIG. 2 illustrates data splitting operation, where split 1, split 2, and split N present the first, second and N-th data split.
Figure 3:
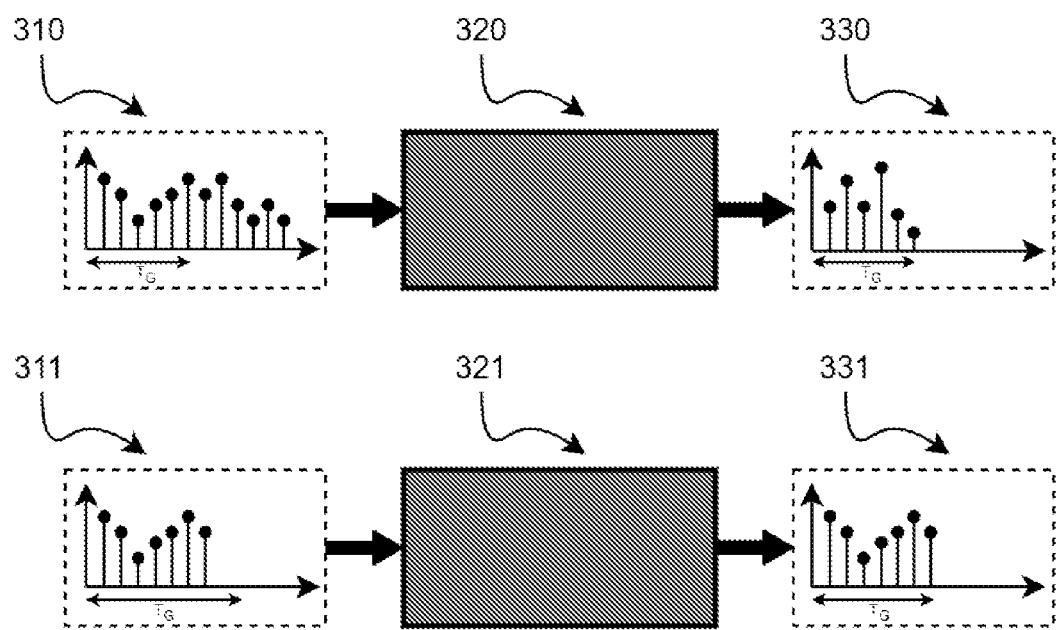
FIG. 3 illustrates channel-based manipulation operation.

FIG. 1 is a flow diagram of the basic operations for wireless communication in accordance with certain aspects of the present disclosure. FIG. 2 and FIG. 3 are illustrations of the second step (120) and the third step (130).

Step (110) presents the selection of the coordinating TPs for the device (420) whose communication is to be secured. The selection process can be based on received signal strength indicator (RSSI), signal-to-interference-plus-noise ratio (SINR), and/or distance.

Step (120) presents the data splitting process. The data (210), which is to be sent to the device (420), is split into N parts, where N is the number of coordinating TPs used. As shown in FIG. 2, the combination of all the split parts should provide the original data (210).

Step (130) presents a channel-based manipulation process of the transmitted split. The channel-based manipulation process ensures that the delay spread, $\tau_{max}$ is less than the guard duration, i.e., $\tau_{max} \leq T_g$. As shown in FIG. 3, in case the original channel (310) has $\tau_{max} > T_g$, it affects the detection process and leads to performance degradation. To cope with this, the channel is passed through the "channel-based manipulation" stage (320), the channel is manipulated in such a way that $\tau_{max} \leq T_g$. The experienced channel (330) provides a better detection process. Moreover, the channel (311) has $T_g > \tau_{max}$, which also leads to reduced spectral efficiency. To cope with this, the channel is passed through "channel-based manipulation" stage (321), where $T_g$ is set to the minimum value such that $\tau_{max} \leq T_g$. The experienced channel is optimized for the intended receiver's spectral efficiency.

Channel-based manipulation (130) process such as channel shortening can be used to shorten the delay spread of the channel by passing the channel through a manipulation technique. Channel-based manipulation (130) process selects the minimum allowable guard duration ($T_g$) with respect to device (420) location.

Figure 4:
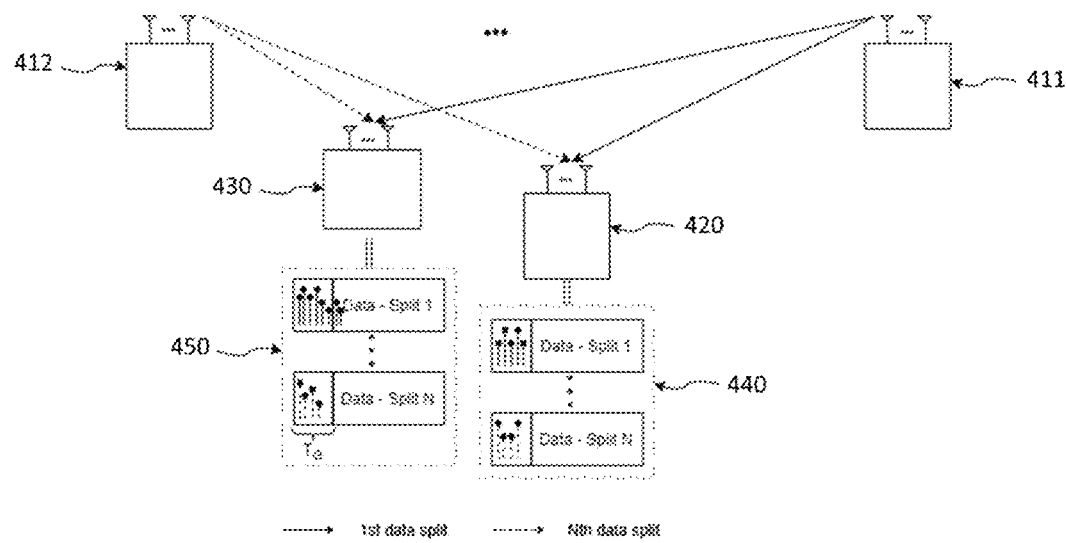
FIG. 4 is an example coordinated network with splitting and channel-based manipulation in accordance with certain aspects of the present disclosure.

FIG. 4 is an example of a coordinated network with splitting (120) and channel-based manipulation (130) process in accordance with certain aspects of the present disclosure. The TPs from TP-1 (411) until TP-N (412) (the first and N-th coordinated TPs) are coordinated to secure the communication with device (420) against attacker (430). The communication nodes can be equipped with single/multiple antennas.

The N-coordinating TPs are splitting the data (210) to N-splits such as TP-1 (411) transmits split 1 (221) and TP-N (412) transmits split N (223) and so on.

The N-coordinating TPs apply a channel-based manipulation process (130) to ensure that the received splits at device (420) from all coordinating TPs experience delay spreads less than the guard duration. As a result, the combined splits (440) at device (420) can be decoded correctly. But this is not the case at attacker (430), where the combined splits suffer from inter-symbol interference (450), which deteriorates its performance.

Any wireless communication technology can utilize this invention to provide protection against eavesdroppers. However, standards like 3GPP-based cellular and IEEE 802.11 based Wi-Fi networks are particularly relevant to the invention due to the support of multipoint coordination provided in both standards [10, 11]. Furthermore, the described method can be implemented on any device, system or network capable of supporting any of the aforementioned standards, code division multiple access (CMDA), frequency division multiple access (FDMA), Global System for Mobile communications (GSM), GSM/General Packet Radio Service (GPRS), Enhanced Data GSM Environment (EDGE), Wideband-CDMA (W-CDMA), Evolution Data Optimized (EV-DO), High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (NR), or other known signals that are used to communicate within a wireless, cellular or internet of things (IoT) network.

REFERENCES

[1] Hamamreh, J. M., Furqan, H. M., & Arslan, H. (2018). Classifications and applications of physical layer security techniques for confidentiality: A comprehensive survey. *IEEE Communications Surveys & Tutorials*, 21(2), 1773-1828.

[2] Wang, Q., Su, H., Ren, K., & Kim, K. (2011, April). Fast and scalable secret key generation exploiting channel phase randomness in wireless networks. In 2011 *Proceedings IEEE INFOCOM* (pp. 1422-1430). IEEE.

[3] Qin, H., Sun, Y., Chang, T. H., Chen, X., Chi, C. Y., Zhao, M., & Wang, J. (2013). Power allocation and time-domain artificial noise design for wiretap OFDM with discrete inputs. *IEEE Transactions on Wireless Communications*, 12(6), 2717-2729.

[4] Hamamreh, J. M., Yusuf, M., Baykas, T., & Arslan, H. (2016, April). Cross MAC/PHY layer security design using ARQ with MRC and adaptive modulation. In 2016 *IEEE Wireless Communications and Networking Conference* (pp. 1-7). IEEE.

[5] Güvenkaya, E., & Arslan, H. (2014, June). Secure communication in frequency selective channels with fade-avoiding subchannel usage. In 2014 *IEEE International Conference on Communications Workshops (ICC)* (pp. 813-818). IEEE.

[6] Ng, D. W. K., Lo, E. S., & Schober, R. (2012). Energy-efficient resource allocation for secure OFDMA systems. *IEEE Transactions on Vehicular Technology*, 61(6), 2572-2585.

[7] Furgan, H. M., Hamamreh, J. M., & Arslan, H. (2017, October). Enhancing physical layer security of OFDM systems using channel shortening. In 2017 *IEEE 28th Annual International Symposium on Personal, Indoor, and Mobile Radio Communications (PIMRC)* (pp. 1-5). IEEE.

[8] Hamamreh, J. M., Basar, E., & Arslan, H. (2017). OFDM-subcarrier index selection for enhancing security and reliability of 5G URLLC services. *IEEE Access*, 5, 25863-25875.

[9] Ozmat, U., Demirkol, M. F., & Yazici, M. A. (2020, September). Service-Based Coverage for Physical Layer Security with Multi-Point Coordinated Beamforming. In 2020 *IEEE 25th International Workshop on Computer Aided Modeling and Design of Communication Links and Networks (CAMAD)* (pp. 1-6). IEEE.

[10] 3rd Generation Partnership Project (3GPP), "Coordinated Multi-point Operation for LTE Physical Layer Aspects (Rel-11)," Technical Report 36.819, ver 11.2.0, Sep. 2013.

[11] Laurent Cariou (Intel). EHT Proposed PAR, *IEEE* 802.11-18/1231r6, March 2019.

The invention claimed is:

1. A method for protecting wireless communication signals from being overheard or intercepted by an eavesdropper, the method comprising:
   selecting coordinating transition points for a device for which secure communication is to be applied;
   splitting data transmitted to the device among the coordinating transition points into N parts in which N is the number of the coordinating transition points; and
   applying a channel-based manipulation of the split transmitted data such that a time of delay spread is less than a time of guard duration.

2. The method of claim 1, wherein the step of selecting coordinating transition points is based on received signal strength.

3. The method of claim 1, wherein the step of collecting coordinating transition points is based a signal-to-interference-plus-noise ratio.

4. The method of claim 1, wherein the step of collecting coordinating transition points is based on distance.

5. The method of claim 1, wherein the step of applying the channel-based manipulation comprises:
   using channel shortening as the channel-based manipulation to shorten the time of delay spread of the channel.

6. The method of claim 1, wherein the step of applying the channel-based manipulation comprises:
   using adaptive guard as the channel-based manipulation to ensure that the time of delay spread is less than the time of guard duration.

* * * * *